Aug. 4, 1931.  H. H. STOUT ET AL  1,817,043
CONVERTER SMELTING
Filed April 8, 1927
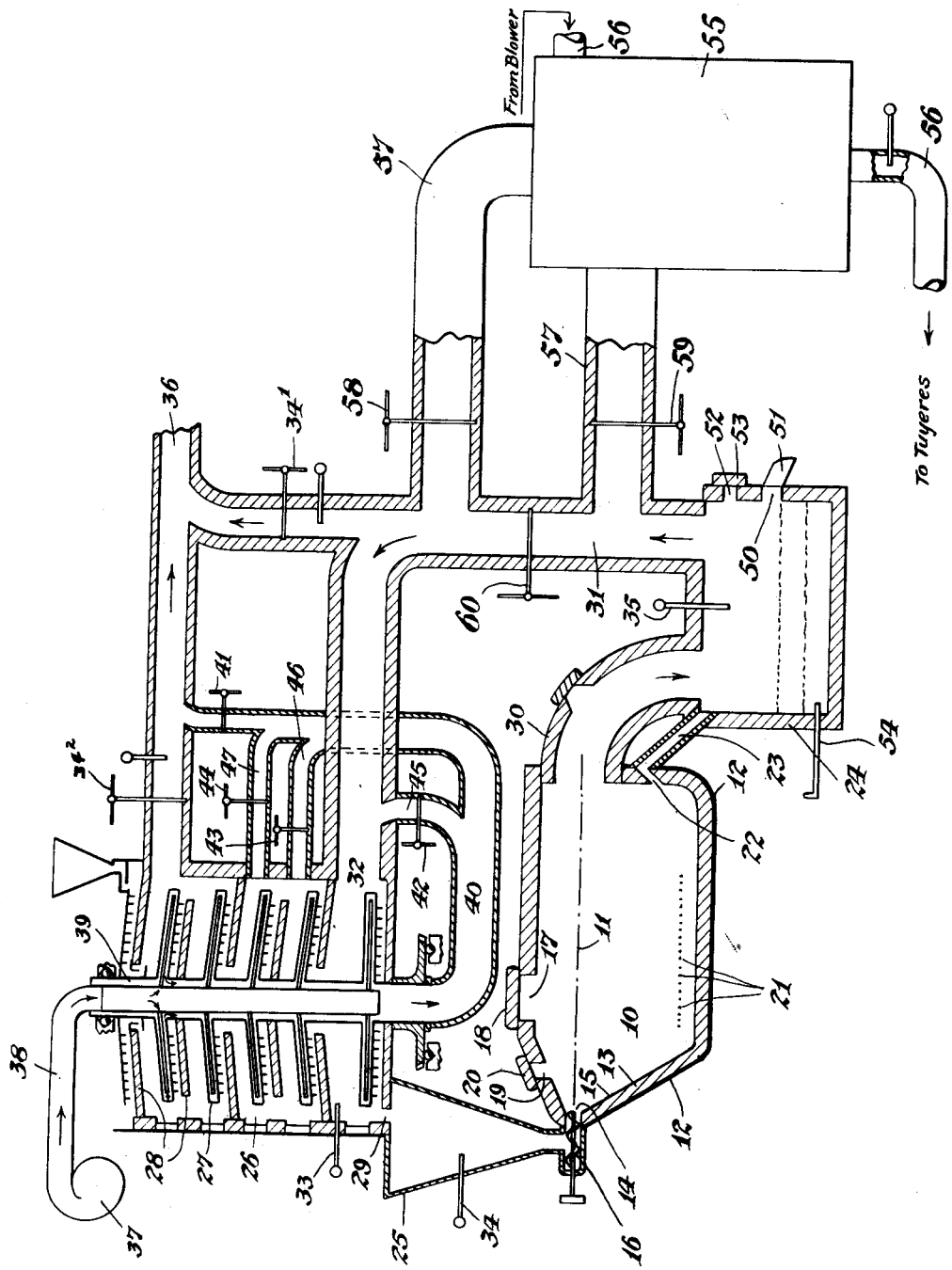

Patented Aug. 4, 1931

1,817,043

UNITED STATES PATENT OFFICE

HARRY HOWARD STOUT, OF CLIFTON, AND JOHN MOORE SAMUEL, OF DOUGLAS, ARIZONA

CONVERTER SMELTING

Application filed April 8, 1927. Serial No. 181,949.

This invention relates generally to the smelting of ores or ore mixtures in vessels of the converter type.

The established standard practice, at present in use, for the pyro-metallurgical reduction of copper-bearing ore mixtures comprises three steps: first, preparation; second, melting; and third, converting. The preparation, or first step, consists in receiving, weighing, sampling, crushing, bedding, and reclaiming the ore or ore mixture. The melting, or second step, is carried out in a blast furnace or in a roaster heater and reverberatory furnace. The converting, or third step, in which sulphur and iron are eliminated from the molten matte produced in the melting, or second step, is carried out in a converter.

This established method or mode of operation, practiced in the reduction of copper-bearing ore mixtures, is open to the serious objection that the second operative step, that is, the melting, is relatively costly, this step representing the major single item of expense reaching, in some cases, as high as fifty-nine per cent. of the total direct plant reduction costs with blast furnace melting and forty-four per cent. with reverberatory furnace melting. The relatively high cost of the melting operation is due to the direct and heavy consumption of fuel by which the melting heat is produced.

This method of operation results in the production in the melting step by the blast furnace or reverberatory furnace, of a slag of sufficiently low copper content to be discarded (hereinafter called a "clean slag") and also in the production in the converter, of a slag of such high copper content (hereinafter called a "foul slag") as to require retreatment in blast furnace or reverberatory furnace.

The general objects of this invention are (1) the elimination of the use of the fuel fired blast furnace and/or fuel fired reverberatory furnace as means of performing the melting operation and the substitution of a converter of suitable design for the double purpose of melting and converting.

(2) The elimination of the use of the fuel used in blast furnace or reverberatory furnace and the substitution of the efficient use of the heat evolved by the oxidation of iron and sulphur in a converter of suitable design.

(3) The production directly in a converter of a "clean slag" of any desired composition.

The accomplishment of these purposes results in the following major benefits:—

(1) The use of costly quantities of fuel (at present the major item of smelting expenses) is eliminated.

(2) Labor used is reduced by the simplification of the process and the elimination of process steps.

(3) The retreatment of plant secondaries or reverts is reduced by the elimination of the production of "foul slag" in the converters.

(4) The cost of building a plant for the smelting of copper bearing ores is considerably reduced by the simplification of the process.

A considerable decrease in cost of smelting copper ores from that given by any known method at present in use, results from each of the above factors.

It has long been sought and many attempts have been made, to reduce the proportionately great cost of the melting operation, but in all such attempts heretofore made, it was found that the cost of converting was increased and that there was an increase in the loss of metal in the slag, so that any partial saving accomplished in the use of fuel was more than counterbalanced by the other factors named.

On the other hand careful calculations, based on the thermal conditions accompanying the reduction operations, have indicated that sufficient heat is generated in the converter to make, if properly conserved and applied, both the melting and the converting steps in the reduction operation self-sustaining, that is, to carry on the melting and converting operations continuously and indefinitely, when once initiated, without the further use of fuel. It has also been determined that the slag produced in a reducing operation of this character would have the chemical analysis and composition characteristic of and demanded by sound and economical metallurgical practice.

In the course of a series of experiments suggested by the results of the calculations referred to and conducted with a view to carrying out the objects of the invention, it has been found that the relatively large heat losses heretofore commonly accepted as inevitably accompanying converter operations, consists of two definite and distinct items. One of these items comprises the radiation, convection and conduction of heat from the outside surface and supports of the converter. This amounts to only seventeen per cent. of the total heat loss. The other and major item comprises direct radiant heat emanating from the interior of the converter through the open mouth to the atmosphere. This occurs not only while the vessel is turned down for receiving or discharging material but also during the periods when the converter is turned up and blowing into the hood.

An important feature of the present invention is the provision of a converter apparatus designed to conserve and utilize the direct radiant heat passing through the mouth of the vessel by applying it to the preheating or roasting of the ore mixtures before delivery to the converter. It has been found that, when the ore mixtures have been thus preheated to a suitable degree, the heat generated in the converter by oxidation and chemical combination is sufficient to make the converter reaction self-sustaining without previous melting of the ore mixture in a separate furnace.

Another feature of the invention resides in the provision of means for controlling the temperatures attained in the preheater or roaster and also in the converter so that the ore will not be heated beyond the point of fusion before entering the converter and an economical working temperature in the neighborhood of 2300° F. will be maintained in the converter. This temperature represents a balance that produces a minimum loss of metal in the slag and is at the same time consistent with an economical lining repair cost. The temperature control or regulation referred to is produced by deflecting desired proportions of the converter gases away from the roaster heater and directly to the boiler or dust catcher. Regulation may also be provided by introducing atmospheric air into the vessel above the batch, or by allowing regulatable portions of radiant heat to escape from the interior of the vessel directly to the atmosphere through openings provided for the purpose. The regulation also includes means for supplying regulated amounts of atmospheric air to the gases in the roaster.

Another feature of the invention resides in the provision of means and methods of operation for cutting down slag losses.

In the prior art, the operation of a converter on copper matte results invariably in the production of slag of high iron content and consequently of high specific gravity and high copper content. This slag produced contains a considerable amount (usually 20% and upwards) of magnetite which dissolves in the slag and causes higher copper losses. This slag will contain 2% to 6% copper and passing it through a settler results in the recovery of only a part of the copper, leaving a "foul slag" containing 2 to 3% copper. Furthermore, to obtain even a high iron slag in the present converter art, it is necessary to use as converter flux, selected ores of high silica content, the purchase of which frequently entails a heavy expense.

We have found that, while the present converter practice results in the production of slags of 50% or more iron and 3 to 6% copper and is limited to the production of such slag and requires the use of costly high silica ores, we can in a converter produce slag of any composition made in any other smelting apparatus at present in use (such as reverberatory furnaces or blast furnaces) free from magnetite and without the use of costly high silica flux and furthermore, we can control at will the composition of slag made in the converter. Neither of these objects has been attained in prior converter practice.

We have found that by adding to a converter bath, ores preheated to a moderate degree (about 650 Fahr.) we produce a slag of about 45% iron, containing 8 to 10% magnetite and which after passage through a settler contain only ¾% copper and that such results could be secured with ordinary ores and without the use of special high silica fluxes.

We have found that by adding to a converter bath, ores preheated to a higher temperature (1000° Fahr. upwards according to the nature of the ore) we produce slag with as low as 38% iron, containing no magnetite and which after passage through a settler contains only 0.3 to 0.4% copper. This result also is obtained without the use of costly high silica fluxes.

We have found that by increasing the degree of preheating the ores, the amount of ore that can be smelted in the converter thereby increases.

We control the composition of the slag by varying the amount of preheating ore added; increasing the degree of preheating of the ore when the quantity of ore is increased and decreasing the degree of preheating of the ore when the quantity of the ore is decreased.

In the present operation of converters, a batch process is used; that is, a charge of matte is introduced into the converter, silicious flux is added and the blowing operation begun. At the begining there is no slag in the converter; as the operation proceeds slag forms and the amount of slag increases until such an amount is present as to require stopping the operation to permit of the removal of this slag. The operating conditions of the converter therefore are not uniform and the blast must penetrate a greater bath as the operation proceeds.

The blast is most efficiently utilized in the converter when the bath level is maintained so as to give approximately uniform required depth of submergence of tuyères and when the ratio of matte present to silicates present is maintained at a considerably higher ratio than in the latter part of the present blowing period.

We make our converter operation continuous (instead of the present batch process), maintain a uniform depth of submergence of the tuyères, maintain a ratio of matte present in the bath to silicates present that is constant and considerably higher than that existing in the latter part of the present blowing period, we accomplish these results by the use of a trap in the discharge orifice through which the molten product escapes from the converter. This molten product passes into a slag settler which is maintained at a suitably high temperature, to permit the metals and their compounds to sink and separate out from the slag, by passing waste gases from the converter through the settler before the gases go to the roaster preheater.

In the previous practice, the use of a slag settler, even if fuel fired, accomplished no desirable result since it was not possible to make in a converter a slag of such composition as to permit the metals and their compounds to separate from the slag by gravity but in combination with our method of controlling slag composition (described above) the slag settler proves an effcient means of separating the metals and their compounds from the slag.

By means of our methods and apparatus it is for the first time possible to continuously smelt in a converter the ordinary average input of a copper smelter and obtain from that converter "clean slag" i. e., fluid slag of sufficiently low copper content to be discarded without further retreatment.

By making use of a slag settler, heretofore associated with blast furnaces and used with converters only when fuel-fired, and passing waste gases from the converter through the slag settler before they arrive at the roaster heater, the temperature of the quiescent slag in the settler may be maintained at a suitably high temperature and low viscosity to permit the metals and their compounds to sink or separate out from the slag.

Another means for cutting down slag losses consists in providing a trap in the discharge orifice through which the molten product escapes from the converter to the settler, the trapping effect functioning to maintain a suitable proportioning in the converter, during blowing, of the quantity of liquid fused slag, the quantity of liquid fused matte, and the quantity of unfused ore, thereby providing a desirable relationship of the ingredients to provide a high oxidizing efficiency of the blast and to prevent the formation of magnetite. The trap permits the withdrawal of molten material below the surface of the mass of material in the converter, thereby permitting the operator to operate the converter in such manner as to maintain the desired quantity of liquid fused slag in the converter at all times.

Another feature of the invention resides in the utilization of the roaster heater, through suitable regulation and control, to reduce the converter blast or blowing requirements with a corresponding decrease in the cost of compressing air for the blast. This is brought about by the conservation and utilization of the heat generated in the ores in the roaster heater by the oxidation of the sulphides of iron contained therein. The sulphur in the ores, known to the art as the "first atom of sulphur", is capable of being distilled off from the ores at suitable temperatures and suitable sizes of ore particles. In the present process in which the roaster heater is used, practically all of this first atom is distilled and oxidized, by the regulated admission of air to the gases, so that as much as one-half of the converter blast used in oxidizing the sulphur content of the ores, is saved.

In the present converter practice, in order to keep the blast of air flowing freely into the converter, it is necessary to "punch the tuyères."

This is accomplished by pushing a bar through the tuyères to remove the accretion of metal or slag formed at the tuyère inlet by the cooling effect of the incoming air. This practice consumes the most of the labor used in the converting process step.

We have found that if the air be preheated to about 700° Fahr. the cooling effect of the incoming air is reduced to a point where it no longer causes an accretion to chill and solidify at the tuyères' inlet. Thereby "punching tuyères" is eliminated and the labor cost of the converter process reduced. Furthermore in the present practice individual tuyère valves must be used to permit tuyère punching and these tuyère valves result in a loss of 10 to 15% of the blast air in the normal operation. By preheating the air, we eliminate the necessity of these tuyère valves and reduce the quantity of high pressure air required for the operation.

With our process, in order to maintain in the converter a temperature sufficiently high for rapid smelting of the ore without the use of extraneous fuel, it is necessary to return to the converter much of the heat carried away by the gases, by radiation, etc. These can be returned to the converter by preheating the ore as has been described above or it can be returned to the converter by preheating the air.

The preheating of the converter blast may be utilized in supplement to or in lieu of the preheating of the ore, as circumstances may require, and is done so and with the end in view that the heat in the ore and the heat in the gases will maintain the temperature of the converter at the required point. A feature of the invention accordingly resides in the provision of means for preheating the converter blast through the use of heat supplied by the converter waste gases, for the double purpose of eliminating the labor of tuyère punching and the blast loss incidental thereto and of maintaining the necessary temperature in the converter.

Still another feature of the invention resides in a converter of the horizontal type mounted to be rotated about an eccentrically disposed horizontal axis. The converter is arranged to discharge its gases into the settler referred to, whence the gases pass to a roaster heater preferably of the multiple hearth type which operates to deliver heated ore to the receiving end of the converter.

Various other features of the invention will be hereinafter referred to.

In the drawing, a single view in vertical longitudinal section represents diagrammatically a construction exemplifying an embodiment of the invention.

Referring to the drawings for a more detailed description of the invention, an ore reduction plant is shown in diagrammatic form which includes operating elements so constructed and related to each other as to provide a suitable example of an embodiment of the invention. The construction includes a converter furnace or vessel 10 having a horizontal disposition and rotatable about a horizontal axis 11 extending longitudinally of the vessel and eccentrically disposed with relation thereto. The converter structure includes the usual metal shell 12 and a lining 13 of heat resistant or refractory material and means are provided, although not shown in the drawing, for rotating the vessel about its axis 11 when desired.

At the left-hand, as shown in the drawings, the converter 10 is provided with a charging opening 14 which leads into a conical end portion 15 of the vessel so that material charged through the opening 14 by the operation of the screw conveyer 16 will slide down the inclined surface of the conical portion 15 of the vessel and be prevented from dropping through space to produce dust which has a corrosive action on refractory furnace linings.

The vessel 10 is also equipped with a manhole 17 provided with a heat insulated cover member 18 and is also equipped with a smaller opening 19 provided with a cover 20. The opening 19 may be used for feeding solid or molten material into the furnace and for observation of the operation thereof. Tuyère openings 21 are provided through which the air blast is blown into the vessel as in standard converter practice. It will be noted that the right-hand end of the vessel 10 is not provided with tuyère openings but a molten products discharge passage 22 is formed in the end wall of the furnace, this opening being so disposed as to provide a trap with a conduit 23 through which molten material is passed into a settler device 24 having the characteristics of a reverberatory furnace. Since the inner end of the trap 22 is below the high point of the trap where it discharges into the conduit 23, it will be observed that the molten material in the converter will not start to discharge through the trap and the conduit 23 until the molten material has risen above the arch or dam portion of the trap. This provides a construction wherein the layer of slag in proportion to the other contents of the converter may be controlled during the operation of the converter, and thereby permit molten material to be flowed out from under the top layer in the converter while the top layer is maintained at a predetermined thickness.

A hopper device 25 is provided for delivering material to the screw conveyor 16 which charges it into the receiving end of the vessel 10 and located above the hopper 25 in a position to feed material thereinto is a roaster device 26 of the multiple hearth type in which rotatably mounted arms or rabbles 27 sweep material from shelf to shelf 28 from the uppermost end of the roaster to the lower end thereof where the material is discharged through the opening 29 into the hopper 25.

At 30 is shown the gas discharge outlet for the converter 10 and it will be seen that the discharge member 30 leads downwardly into the settler device 24 which has already been referred to. By this arrangement molten material charged into the settler 24 from the converter 10 is maintained in a heated and liquid condition to permit thorough separating out of the metal from the slag so that the losses of metal in the slag are materially reduced in comparison with the slag losses characteristic of the prior art. It will also be seen that the utilization of gases issuing from the converter 10 for the purpose of maintaining the desired temperatures in the settler device 24 does away with the use of fuel for this purpose.

In order to preheat or roast the ore mixtures contained in the roaster 26 the hot gases passed through the settler device 24 are conveyed through a conduit 31 to the lower end of the roaster at 32. The hot gases passing into the roaster at the lower end thereof pass upwardly therethrough against the travel of the ore mixture being handled by the rabbles 27 so that the ore particles are thoroughly engaged and heated by the hot gases from the conduit or flue 31.

In order to exercise a regulation or control over the temperature attained in the material passing through the roaster 26, pyrometers 33, 34 and 35 are inserted through the walls of the roaster 26, the hopper 25, and the space above the charge in the settler 24 so that the temperature conditions at these locations can be observed. Should the temperature exceed a degree suitable for the operation, a damper 34' placed in an extension of the vertical portion of the flue 31 may be opened to allow any desired proportion of the hot gases rising through the flue 31 to be diverted through a flue 36 to a dust box or, if desired, to be applied in heating a steam boiler or the like. Dampers 34' and 34² are operated inversely to deflect the gases from the settler around or through the roaster heater—when one is opened slightly the other is closed slightly. Further control and regulation of temperature of the roasting or preheating operation conducted in the roaster 26 may be attained by the manipulation of a supply of air which is provided by the blower 37 and which is forced through the conduit 38 downwardly through the hollow shaft 39 of the rotating part of the roaster structure. The air, when it has served its purpose of cooling the rotating parts, is discharged through the channel 40 into the discharge flue 36 for gases, if no addition of air is desired for the hot gases entering the roaster 26. Should it be necessary to add air to the hot gases either to cool the same or to increase the oxygen content thereof, dampers 41, 42, 43, and 44 are manipulated to close the passage into the discharge flue 36 and to divert the air through one or more of the passages 45, 46 and 47 into the interior of the roaster 26. It will thus be seen that a doubly effective regulation of the temperature of the roaster 26 as well as of the converter 10 is provided in the manner described, that is, by regulating the proportion of hot gases supplied to the roaster, or by varying the amount of air supplied to the roaster or to the hot gases entering the roaster.

Should the temperature conditions, because of the reactions with sulphides contained in the ore mixtures, rise to a point which would endanger the refractory linings of the apparatus, the temperature may also be lowered by the addition of cold material to the contents of the converter through the opening 17 or by the admission of atmospheric air into the vessel in the space above the bath. It will thus be seen that an effective control or regulation of the temperature in order to maintain an effective operating temperature of approximately 2300° F. can be readily provided by one or more of the various methods referred to.

By the use of the settler device 24, which is in effect a furnace of the reverberatory type, a quiescent condition of the contents of the settler is maintained which facilitates the stratification and consequently the separating out of the metal from the slag. This desirable functioning of the settler device is brought about through the maintenance therein of suitable temperature conditions which provide a low degree of viscosity favorable to the separating or settling action referred to. This temperature condition is maintained, as has already been referred to, by the action of the hot gases, passing through the discharge conduit 30 of the converter 10, on their way into the conduit 31 whereby they find their way to the roaster 26.

The settler 24 is provided with a slag discharge opening 50 which leads into a spout 51. The settler is also provided with an observation opening 52 normally covered by a refractory lined cap 53. At the other end of the settler a tapping bar 54 is provided by means of which the molten matte may be withdrawn from time to time. The tapped matte product may be transferred to a subsequent stage in the operation or to a blister converter as desired.

It will also be seen that in general by use of the apparatus described the conservation and the utilization of heat obtained by the practice of the process substantially reduces the cost of the reduction operation as a whole and effects a material saving in metal heretofore wasted in slag losses.

In the event that ore mixtures of relatively low sulphide content are treated it may be necessary to heat the ore entering the converter to a temperature such that the material of which the roaster heater is constructed will deteriorate too rapidly for economical operation. In such a case it is contemplated that a rotary kiln may be interposed between the roaster heater and the converter, or the rotary kiln may replace the roaster heater to thereby produce the relatively high preheating temperatures required. It will be understood that the ore mixtures, of whatever content, should be heated to a point short of sintering to thereby prevent the clogging or accumulation of material in hoppers, chutes and the like.

If the total heat of oxidation and slag formation be properly conserved and utilized in the carrying out of the process, there is an excess of heat over and above what is necessary to make the smelting and converting operations self-sustaining from a thermal standpoint. This excess of heat can be economically utilized for the production of steam in waste heat boilers, or for any other suitable purpose as may be found desirable.

Another feature of the invention resides in the use of the discharge flue 30 for the converter. This flue is insulated against heat loss so that the inside surface thereof is maintained above the fusion point of the molten particles projected through the converter mouth by the blast with the result that there is a marked absence of the accretions of material which ordinarily form on the inner surfaces of the converter hoods in the prior art.

The regulation and control against excessive temperatures which is provided makes it possible to use insulating materials to prevent loss of heat throughout the apparatus in all the flues and chambers and this is taken advantage of in the construction of the apparatus.

It is also possible to operate the process in one or more stages to still further reduce slag losses. In this event each unit in the system embodies all the essential principles of the process described, the only differences residing in the size and relative proportion of vessels and flues in accordance with the work performed by each.

Various arrangements of apparatus for carrying out the essentials of the process may be utilized separately or in conjunction with other apparatus. For example, two or more relatively small converters may be fed by the same roaster heater.

In order to preheat the converter blast either to increase the temperature of the converter or to prevent solidifying of the molten metal around the tuyères openings with a resulting reduction in tuyères punching, a heat interchanger 55 may be employed through which the blast pipe 56 is passed to receive heat from a branch extension 57 of the flue 31. Dampers 58, 59 and 60 are used to provide a regulated supply of hot gases to the heat interchanger 55 to preheat the converter blast to the desired degree. It will be clear that the preheating of the converter blast may take place after the preheating of the ore if desired, the heat interchanger being located at a later point in the system for the purpose. And, by appropriate manipulation of the dampers, it will be possible to use the converter waste gases entirely for preheating ore, or entirely for preheating the converter gases, or partly for ore heating and partly for blast heating.

It would be possible in some cases to simply dry and feed the incoming ore and by preheating the blast to a regulatable point with the converter waste heat gases to maintain the temperature of the interior of the converter at a suitable point. It is seen that the return of heat to the converter in regulatable amounts, from the exit waste heat converter gases, can be done by regulatably preheating the ore and or regulatably preheating the converter blast air by these gases.

The process of operation described may be started into action by the application of commercial fuel to the converter and permitting the waste gasses produced thereby to pass through the system for heating it to a suitable initial temperature. The operation may also be started by supplying molten matte produced elsewhere to the converter and blowing the same to provide the necessary initial blast. Any other suitable means may be provided for accomplishing the initiation of the operation. Knowing the average composition of the various ores tributary to a copper smelter, the quantity of each can be calculated which, when combined, will produce the most economically satisfactory slag. The composite and elementary analysis of the combined ore mixture can be ascertained and from this the reactions in the various vessels can be calculated. Accordingly, the amount and thermal condition of the gases in each vessel can be computed and the apparatus so proportioned in its design as to handle at a minimum cost the average material received. And by the utilization of the various described methods of temperature control and regulation the thermal condition of the vessels and gases can be controlled to accommodate the constant fluctuations in the composition of the ores received so as to maintain the temperature of the converter at the most suitable point. It will thus be seen that a new and improved process and apparatus have been developed for the economical reduction of copper-bearing ores containing sulphides, which by conservation and utilization of the heat of reaction between the ore and the oxygen of the air, and applying the same under suitable regulation and control to preheat or roast the ore before it is fed to the converter, and/or to preheat the converter blast, has made the reduction operation self-sustaining from a thermal point of view. The improved process has thereby eliminated the preliminary melting of the ore in a reverberatory or a blast furnace and has so controlled the temperature and the slag composition that the maintenance cost and slag losses are within satisfactory economic limits.

The language and expressions which have been employed throughout the specification are used as terms of description only and not of limitation, and such terms are intended to include all the equivalents and such modifications as are possible to be employed within the scope of the invention claimed.

What I claim is:—

1. That method of pyro-metallurgical concentration of metal from ore which comprises a regulated preheating of the ore before it enters the converter in the gases issuing from a converter and regulatably admixed with air.

2. That method of pyro-metallurgical concentration of metal from ore before it enters the converter which comprises a regulated roasting of the ore in the gases issuing from a converter and regulatably admixed with air.

3. That method of smelting ore which comprises charging the ore into a roaster of the multiple-hearth type, and in passing gases issuing from a converter into the roaster with regulated addition of air.

4. That method of smelting ore which comprises charging the ore into a roaster of the multiple-hearth type, and in passing regulated amounts of the gases issuing from a converter into the roaster with regulated addition of air.

5. That method of smelting ore which comprises charging the ore into a roaster, in passing regulated amounts of the gases issuing from a converter into the roaster, and in adding regulated amounts of atmospheric air to said gases.

6. That method of melting and converting ore containing sulphides which comprises preheating the ore in gases issuing from a converter, in supplying air to the gases, and then feeding the heated ore into the converter.

7. That method of melting and converting ore containing sulphides without the use of carbonaceous fuel which comprises roasting the ore in a regulated supply of gas issuing from a converter, in supplying regulated amounts of air to the gases, and then feeding the heated ore into the converter.

8. A process for melting and converting copper-bearing ores containing sulphide which comprises the utilization of regulated amounts of the hot gases issuing from the mouth of a converter with regulated addition of air to preheat the ore fed to the converter to thereby maintain the temperature of the interior of the converter at the most economical point during the melting and converting of the ore.

9. A process for smelting copper-bearing ore mixtures containing sulphides which comprises the bringing of regulated quantities of gases issuing from a converter into contact with the ore mixtures, and in admitting regulated amounts of air for the purpose of substantially eliminating and oxidizing the first atom of sulphur without the substantial addition of oxygen to the ore.

10. That method of smelting copper-bearing ore containing sulphides which comprises bringing regulated quantities of gases issuing from a converter into contact with the ore mixtures, in admitting regulated amounts of air for the purpose of substantially eliminating and oxidizing the first atom of sulphur without the substantial addition of oxygen to the ore, and then in feeding the treated ore into a converter.

11. That method of operating a converter which consists in passing regulated amounts of the gases issuing from the converter mouth through a settler into which the molten products of the converter are discharged.

12. A process for melting and converting in a converter previously preheated copper-bearing ore containing sulphides, which includes passing the gases issuing from the converter through a settler into which the molten products of the converter are discharged, and in controlling the temperature of the interior of the settler by regulating the degree of preheating of the ore.

13. A process for melting and converting in a converter a preheated copper bearing ore mixture containing sulphides, which includes the control of the composition of the resulting slag by regulating the extent of preheating of the ore mixture.

14. A process for continuously melting and converting in a converter a preheated copper-bearing ore mixture containing sulphides, which comprises the maintaining of the amount of molten silicates within the converter in the proper proportion to the amount of molten matte to bring about an economical slag combination reaction, by continuously supplying suitable ore to the converter and continuously withdrawing molten material from the converter at the same rate as the said ore is supplied.

15. A process for continuously melting and converting in a converter, a preheated copper-bearing ore mixture containing sulphides, which comprises the maintaining of the amount of molten silicates within the converter in a controlled proportion to the molten matte, by maintaining a predetermined level in said converter while supplying ore thereto and withdrawing molten material therefrom.

16. That process for smelting in an apparatus of the converter type copper-bearing ore mixtures containing sulphides which consists in suitably proportioning and crushing the ore mixture to produce the most economical slag, in providing a regulated preheating of the ore mixture in regulated amounts of the gases issuing from a converter, in admitting regulated amounts of air to the gases, in melting and converting the ore mixture in a converter by the heat generated in oxidizing the charge with the converter blast, in discharging the molten products into a settler, and in passing the gases issuing from the converter through the settler.

17. That process for smelting copper-bearing ores containing sulphides which consists in melting and converting the ore mixture in a converter and in providing a regulated preheating of the converter blast previous to its entrance to the converter.

18. That process for smelting copper-bearing ores containing sulphides which consists in melting and converting the ore mixture in a converter, and in preheating the converter blast by the use of regulated amounts of the hot gases issuing from the converter.

19. A process for melting and converting, in a converter, a copper-bearing ore mixture containing sulphides which includes the step of returning to the converter regulated amounts of the heat contained in the hot gases subsequent to their exit from the converter, by suitably transferring to the incoming blast and to the incoming ore mixture, regulated amounts of such heat to each as will maintain the temperature of the converter at a suitable point.

20. A process for melting and converting ores containing sulphides which includes utilizing the heat of the reactions within the converter to preheat the ore to be fed to the converter and to preheat the converter blast, by passing regulatable amounts of the gases issuing from the converter with regulatable amounts of air, up through an apparatus of the multiple hearth roaster type through which the ore descends, and by transferring regulatable amounts of the sensible heat of the issuing converter gases to the converter air blast.

21. A process for melting and converting ores containing sulphides which consists in utilizing a regulated portion of the sensible and the radiant heat issuing from the mouth of the converter to preheat the ore fed to the converter and to preheat the air blast delivered to the converter, by passing regulatable amounts of the gases issuing from the converter with regulatable amounts of air through an apparatus of the multiple hearth roaster type through which the ore descends and by transferring regulatable amounts of the sensible heat of the issuing converter gases to the converter air blast and by providing a converter vessel having an eccentrically disposed axis of rotation and a gas outlet at one end concentrically disposed with relation to said axis of rotation whereby the dissipation of sensible heat of the converter gases as radiant heat issuing from the mouth of the converter is reduced and a greater quantity of heat is consequently retained in the gases as sensible heat available for transfer to the ore and the air blast.

22. The method of smelting and converting copper ore containing sulphides, said method comprising preheating said ore in a multiple hearth roaster furnace, feeding the hot ore to a converter, supplying said converter with preheated blasts of air and supplying said roaster with regulatable amounts of hot gases issuing from the converter.

23. The method of smelting and converting copper ores containing sulphides, said method comprising preheating said ore in a multiple hearth roaster furnace, feeding said hot ore from said furnace to a converter, maintaining the slag in said converter at a predetermined level, subjecting the material in said converter to blasts of air heated by the hot gases issued from said converter.

24. The method of smelting and converting copper containing sulphides and silica, which method comprises preheating said ores, supplying said preheated ores to a converter, smelting said ores into a melted mass, subjecting the melted mass in said converter to blasts comprising atmospheric air heated by the hot gases from said converter, and maintaining the level of the molten mass in said converter at substantially a predetermined height.

25. The method of smelting copper ore containing sulphides, said method comprising smelting said ore in a converter, utilizing a portion of the hot waste gases from said converter to preheat the said ore before it is introduced into said converter, and also utilizing a portion of said hot waste gases from said converter to preheat blasts of atmospheric air supplied to said converter beneath the charge in said converter.

26. The method of smelting copper ore containing sulphides, said method comprising smelting said ore in a converter, utilizing hot gases from said converter to preheat said ore before introducing the ore into the converter, blowing a blast of heated air under pressure through the material in said converter, and also utilizing said hot gases from the converter to preheat the blast of air, and regulating the preheating steps to regulate the heat within the converter.

27. The method of smelting copper ores containing sulphide, which method comprises smelting the ores in a converter, introducing a continuous supply of hot ore into said converter, withdrawing molten material from said converter at the same rate at which the ore is supplied to the converter to maintain a substantially constant level within the converter, heating the ore before it enters the converter by hot gases from the converter, and controlling the amount of the heating of said ore to control the temperature within said converter.

28. The method of smelting copper ore containing sulphides comprising smelting the ore in a converter, passing the material from the converter into a settler, passing the hot waste gases from said converter into said settler, and utilizing the said hot gases from the settler to preheat the ore to be fed to the converter.

In testimony whereof we affix our signatures.

HARRY HOWARD STOUT.
JOHN MOORE SAMUEL.